United States Patent Office 2,867,588
Patented Jan. 6, 1959

2,867,588

PROCESS FOR PREPARING ALUMINA CATALYST COMPOSITIONS

Carl D. Keith, Munster, Ind., and Anna P. Hauel, West Orange, N. J., assignors to Engelhard Industries, Inc., a corporation of New Jersey No Drawing. Application March 30, 1955
Serial No. 498,084

6 Claims. (Cl. 252—466)

This invention relates to production of alumina hydrate compositions of value as precursor base compositions for calcined alumina base catalysts. These hydrate compositions have particular utility as base compositions for calcined alumina base catalysts containing a platinum metal having hydrocarbon conversion activity.

In the hydrocarbon conversion field, platinum-alumina catalysts have become commercially important in catalytic reforming operations designed to convert virgin naphthas of low octane to high octane gasoline stocks and to produce aromatics from selected gasoline fractions. A number of factors are significant in development of platinum-alumina catalysts of activity and selectivity suitable for commercial utilization. Because of the high cost of platinum-containing catalysts, long catalyst life, measured by a low rate of activity decline, is even more important than high initial or virgin activity. A critical factor in determining catalyst life as well as activity and selectivity is the nature of the alumina base. It has been found, as described in application Serial No. 288,058, filed May 15, 1952, by John W. Teter, John L. Gring and Carl D. Keith, now abandoned, and, in its continuation-in-part application Serial No. 489,726, filed February 21, 1955, that a catalyst having a calcined alumina base produced from a mixture of precursor hydrous alumina phases containing from about 65 to about 95 weight percent alumina trihydrate possesses a number of significant advantages in use as a reforming catalyst or a catalyst for production of aromatics. The finished catalyst has a base structure characterized by large pore volume, e. g., generally greater than about 0.10 cc. per gram of its pore volume in pores of more than 100 angstrom units in size, high surface area, e. g., about 350 to about 550 square meters per gram, when the precursor alumina hydrate composition is dried and calcined; and it contains about 0.1 to about 1.0 percent by weight of a platinum metal present in sufficiently finely distributed form as to exhibit by X-ray diffraction analysis the substantial absence of crystallites larger in size than about 50 angstrom units. The resulting catalysts have high activity including unusually high dehydrocyclization activity, low rates of activity decline and can be regenerated by oxidative means.

As described in the above applications the alumina precursor composition is produced from an alumina hydrogel which may be formed by precipitating gelatinous hydrous alumina from an aqueous solution of a soluble aluminum salt such as aluminum chloride by means of ammonium hydroxide. Aqueous ammonium hydroxide is added to the aluminum chloride solution until a pH of about 8 has been reached while stirring the mixture vigorously. The precipitation consequently is conducted for the greater part on the acid side. Following the precipitation, the precipitate is separated and washed with water in order to reduce the concentration of contaminating ions, e. g. chloride ion in the case of ammonium chloride, to a low limit usually less than about 0.2 percent by weight. The washed precipitate then is converted, usually by aging as long as necessary, or by seeding, from the predominantly amorphous state as freshly precipitated to a mixture predominating in the crystalline trihydrate forms of alumina. The trihydrate phase contains forms as determined by X-ray diffraction analysis of dried samples corresponding to gibbsite, bayerite and a new form of alumina trihydrate which appears to be intermediate gibbsite and bayerite in crystalline structure and which has been termed randomite. The precursor base also contains about 5 to about 35 weight percent of other hydrous aluminas in the form of alumina monohydrate, e. g., boehmite, as detected by X-ray analysis after drying or in the form of amorphous hydrous alumina, or mixtures of these forms.

The precious metal component, rhodium, palladium, iridium, or most advantageously platinum, may be incorporated through mixing the alumina component with the desired amount of precious metal component in the form of a soluble or colloidally dispersible compound. For example, chloroplatinic acid may be added to the slurry and precipitated by introduction of hydrogen sulfide in aqueous solution. Alternatively, the platinum may be introduced in the form of a sulfide sol. The catalyst composition is finished by drying the hydrate slurry, advantageously under controlled conditions, e. g. for about 24 hours at 110 to 120° C. and at a pH of about 6 to about 9. The dried composition then may be formed into tablets or pills or may be rewetted and extruded to particles of desired size. The resulting catalyst particles can be calcined by heating to about 800° to about 1200° F. for a period of about 3 to about 12 hours in an atmosphere of a flowing oxygen-containing gas. Before use, the catalyst can be reduced by subjecting it to flowing hydrogen at about 800° to about 1100° F. for a period up to several hours.

It has now been found desirable in preparation of the alumina hydrate precursor composition to precipitate substantially the entire hydrate at a pH within the range of 7 to about 9.5 and preferably of about 7.5 to about 9.5. Thus the process of the present invention employs a precipitating pH nearly constant. The temperature also should be controlled in the range of about 70° to about 160° F. By conducting the precipitation in this manner, it was found that rapid transformation of the amorphous hydrous alumina precipitate to the desired precursor trihydrate composition results. It was also found that the calcined alumina-platinum metal catalysts produced from the resulting hydrate precursors have high indicated activity levels and low activity decline rates when subjected to activity and catalyst aging tests.

In the practice of this invention, an aqueous solution of a salt of aluminum and aqueous ammonium hydroxide are mixed by flowing the solutions together continuously while controlling the pH of the resulting mixture between 7 and about 9.5 and while controlling the temperature between about 70° to about 160° F. The aluminum salt is desirably aluminum chloride, particularly an aluminum chloride of high intrinsic purity especially with respect to freedom from heavy metal contaminants such as iron and alkali metals. The precipitate produced is separated from suspension, e. g. by filtration, and the precipitate is washed with water to remove substantially all contaminating water-soluble ions, e. g. to reduce chloride concentration to less than about 0.2 percent. The washing is conducted at a pH of at least about 7, e. g., about 7 to about 10, which may be adjusted by the addition of a small amount of ammonium hydroxide to the wash water. The wash water temperature can vary widely and generally will be in the range of about 50 to about 160° F. The hydrate composition is converted to trihydrate, preferably about 65 to about 95 weight percent trihydrate, by aging until the desired concentration of trihydrate phases, advantageously determined by X-ray analysis of samples dried at 110° C., has been completed. Suitable aging temperatures can range from about 70 to about 170° F., with higher temperatures accelerating aging. The conversion can be further accelerated by selective seeding with small crystallites of one or more of the desired alumina trihydrate phases. The reacting solutions are employed in concentrations providing good mixing. For example, in a continuous flow stream, a solution of about 15 pounds of $AlCl_3 \cdot 6H_2O$ in 19 liters of water and a solution equivalent to 5.5 liters of ammonium hydroxide of 27 to 30 percent ammonia content in 18 liters of water are suitable. The water also should be in a high state of purity either as the result of distillation or deionization with an ion exchange resin. The washing operation may be conducted by conventional procedures, for example by washing the precipitate upon a rotary filter or by employing a plate and frame press, reslurrying the precipitate after each operation. Aluminum chloride is preferred as a source of aluminum but other salts of aluminum with strong inorganic acids may be employed, such as aluminum sulfate or aluminum nitrate.

When the precipitation of the hydrate is accomplished by mixing aqueous streams of ammonium hydroxide and aluminum chloride of substantially constant concentrations, it will be appreciated that the ammonium chloride concentration of the resulting slurry will be substantially constant. The use of the constant ammonium salt concentration along with the controlled pH is preferred and can be accomplished by mixing the reactant streams in a flow pipe or pump to effect the precipitation. Alternatively, precipitation can be effected by mixing the streams and passing the mixture to a tank. The slurry in the tank is preferably agitated for uniformity.

In addition to providing a fast rate of transformation of the amorphous hydrous aluminas to crystalline alumina trihydrates and affording finished catalysts having excellent activity and aging properties, the new process provides advantages in economy of plant and ease of operation. The precipitation can be carried out in small volume equipment by simply mixing flowing streams of the reactants in a pipe or small mixing vessel prior to pumping the resulting slurry to filters. Thus, the process is specially suitable for continuous processing. The rapid conversion to trihydrates reduces the aging time to the point that it is not necessary to consider seeding for practical operation.

The new process will be illustrated by the experimental examples which follow:

Example I

The precipitation was made in a 30-gallon rubber-lined tank fitted with an air-driven stirrer. Fifteen pounds of du Pont Technical $AlCl_3 \cdot 6H_2O$ (very low in iron) was dissolved in 11 liters of deionized water and placed in a 5-gallon calibrated bottle fitted with a syphon. The total volume equalled 15 liters. 5.5 liters of C. P. reagent $NH_4OH$ (27–30 percent $NH_3$) was diluted with 9.5 liters of deionized water and placed in a 5-gallon calibrated bottle. Fifteen liters of deionized water was placed in the 30-gallon tank, and while vigorously stirring, the addition from separate flow lines of approximately 0.5 liter per minute of each of the $NH_4OH$ and $AlCl_3 \cdot 6H_2O$ solutions was started. The flow of reactants was adjusted so that the pH in the tank would hold at approximately 8. As water was in the tank before the addition of the reactants, the ammonium chloride concentration varied during precipitation. The following is a log of precipitation:

| Total time, min.: | pH |
|---|---|
| 2 | 7.45. |
| 4 | 8.35. |
| 6 | 7.5. |
| 8 | 8.15. |
| 10 | 8.0. |
| 10–12 | Flow of reactants stopped; changed to more efficient stirrer. |
| 14 | 8.35. |
| 18 | 8.25. |
| 22 | 7.85. |
| 24 | 8.3. |
| 26 | 8.35. |
| 28 | 7.90. |
| 30 | 7.85. |
| 32 | 8.15. |
| 33 | 8.0. |
| | Completed precipitation. |

Used all $AlCl_3 \cdot 6H_2O$ solution and 14.6 liters of $NH_4OH$ solution.

The slurry was stirred for 30 minutes after the precipitation was completed. The hydrate was filtered from the mother liquor in a plate and frame press and washed in the press for approximately 16 hours with 70–80° F. deionized water. The cake was reslurried in 15 gallons of deionized water (approximately 5 gallons deionized water per pound $Al_2O_3$) and the pH was adjusted to 9.0 by adding dilute $NH_4OH$. The slurry was stirred for 15 minutes. The hydrate was filtered from the wash slurry and was washed in the press for approximately 20 hours. The above step was repeated. This treatment reduced the chloride ($Al_2O_3$ basis) to 0.03 percent. The washed cake was allowed to stand at room temperature until used.

The following X-ray diffraction data were obtained for samples of the hydrate dried at 110° C.:

| Description | Age in days from ppt'n | Total percent trihydrate | Percent Amor. | Percent Boeh. | Percent Bay. | Percent Rand. | Percent Gibb. |
|---|---|---|---|---|---|---|---|
| Cake after wash No. 1 | 1 | 0 | 60 | 40 | | | |
| Cake after wash No. 2 | 2 | 74 | 8 | 18 | 33 | 15 | 26 |
| Cake after wash No. 3 | 3 | 80 | 8 | 12 | 33 | 15 | 32 |
| Do | 14 | 92 | 8 | Tr. | 33 | 24 | 35 |

A portion of the above alumina hydrate (407–65) aged 11 days (92 percent trihydrate) was used as the base for catalyst 400–F9226. Alumina hydrate 407–65, 2,475 grams (containing 198 grams $Al_2O_3$), was mixed with 1.68 liters of deionized water in a 3-gallon stoneware jar and stirred vigorously for 30 minutes to effect thorough dispersion of the hydrate; pH=7.2. With continued stirring, an ammonium fluoride solution consisting of 2.92 grams of $NH_4F$ dissolved in 100 ml. of deionized water was added over a 5-minute period. After 30 minutes additional stirring, 116.3 ml. of chloroplatinic acid solution, equivalent to 0.7 gram of platinum was added over a 5-minute period. After 5 minutes additional stirring 163 ml. of deionized water saturated with hydrogen sulfide was slowly added. (This is 100 percent excess hydrogen sulfide of that calculated to form $PtS_2$.) The slurry was stirred an additional 30 minutes (pH=8.5) prior to drying.

The slurry from the above was poured into a Pyrex tray and dried in an Aminco (forced air) oven at 120° C. The dry catalyst was ground to pass 20-mesh, mixed with 2 percent Sterotex (an organic die lubricant) and formed as 5/32″ x 5/32″ tablets. The Sterotex was burned out at 900–935° F. using a flowing gas stream containing 5 parts of air plus 300 parts of nitrogen. The oxygen content was then slowly increased and finally the catalyst was calcined 6 hours at 900° F. in straight air. The calcined catalyst was assigned No. 400–F9226 and the following analyses were obtained:

| | |
|---|---|
| Percent V. M. (ignited at 1000° C.) | 2.45 |
| Percent Pt (dry basis) | 0.36 |
| Percent F (dry basis) | 0.72 |
| A. D. (grams/cc.) | 0.69 |

The following tabulation gives virgin activity data for catalyst 400–F9226.

*Test conditions.*—250°–400° F. Mid-Continent naphtha feed, 500 p. s. i. g., 4.4 WHSV, 5$H_2$/HC-ratio.

| | |
|---|---|
| Sample No. | 400–F9226 |
| Composition calculated | $Al_2O_3$+0.75%F+0.35%Pt |
| A. D. (gs./cc.) | 0.69 |
| 870° F. test: | |
| Wt. percent stabilized reformate | 82.7 |
| Wt. percent O. H. | 2.8 |
| R. M. O. No. (neat) | 87.2 |
| 890° F. test: | |
| Wt. percent stabilized reformate | 77.5 |
| Wt. percent O. H. | 5.0 |
| R. M. O. No. (neat) | 91.7 |
| 910° F. test: | |
| Wt. percent stabilizer reformate | 75.2 |
| Wt. percent O. H. | 7.0 |
| R. M. O. No. (neat) | 95.1 |

The aging properties of catalyst 400–F9226 were determined in an aging run carried out in a bench scale metal reactor equipped for continuous processing. A Mid-Continent naphtha feed was employed and the run was conducted under processing conditions of 925° F., 500 p. s. i. g., 3 weight hourly space velocity and a recycle gas to hydrocarbon ratio of 10:1. The run produced an initial 97.5 neat octane reformate and was terminated at 378 hours at an octane level of about 93 CFR.

*Example II*

An alumina base 516–170 was prepared by first dissolving pure aluminum in pure hydrochloric acid and then mixing the resulting solution with deionized water to form an aqueous $AlCl_3$ solution equivalent to approximately 65 grams of $Al_2O_3$ per liter. This solution was mixed with a deionized water solution of $NH_4OH$ containing approximately 65 grams of ammonia per liter. The two reagents in an approximate volume ratio of 1:1 were charged to a common flow pipe and contacted each other without producing a visible precipitate. The contact time of the flowing streams after mixing was one second and the overall stream was at a pH of 8.0. The reagents combined to precipitate at 91° F. the alumina hydrate at the pH of 8.0 when the liquid stream impinged upon the surface of a stoneware container into which it was passed or upon the surface of slurry being passed to and agitated in the container. The hydrate was filtered from the mother liquor and washed to 0.18 weight percent chloride. In the washing, five filtrations were effected using a rotary vacuum filter and after each filtration the cake was reslurried in deionized water and the pH of the slurries was adjusted to 9.0 by $NH_4OH$ addition. The washed hydrate was aged as a filter cake for 9 days at room temperature.

The following X-ray diffraction data were obtained for the aged hydrate dried at 110° C.:

| | Wt. percent |
|---|---|
| Bayerite | 37 |
| Randomite | 32 |
| Gibbsite | 23 |
| Boehmite | 13 |

This analysis totals more than 100% but this is within the accuracy of the X-ray diffraction technique. The hydrate base was impregnated with platinum by slurrying in a stoneware container 23.4 kg. in sufficient deionized $H_2O$ to give a mixture containing 6.9 weight percent $Al_2O_3$, and contacting with a deionized water solution of $H_2PtCl_6$. The platinum was precipitated by addition of a deionized water solution saturated with $H_2S$ at 78° F. The pH of the slurry was adjusted to 7.0 by $NH_4OH$ addition, and the solids of the slurry were dried in a horizontal spray drier to give a catalyst powder.

The impregnated, dried catalyst powder was combined with ten other batches prepared in essentially the same manner including aging as a filter cake unimpregnated with platinum for varying periods from 9 to 21 days. A twelfth batch was prepared as the other eleven except that the precipitation of the hydrate from the aluminum chloride and ammonium hydroxide solutions was effected by mixing these reagents at a pH of 8.0 in a Jabsco pump having a rubber fin impeller which forced the solutions against the pump casing.

A composite of the portions of the spray dried catalyst powder was made and 4000 grams of this composite were mixed for ten minutes with 1140 ml. of deionized water in a 20-quart Readco planetary-type dough beater. The resulting mixture was forced through a 1/16-inch die by means of a Welding Engineers 2-inch twin screw extruder. The resulting strands were broken by hand and sieved to yield a fraction between 1/16-inch and 5/32-inch lengths. The pellets were oven dried at 110° C. for sixteen hours and then heated in a vertical silica calciner. During calcination the catalyst was brought to 480° C. in a flow of nitrogen and then held for three hours between 470° and 480° C. in a flow of air. During calcination 650 volumes of gas per hour were employed for each volume of catalyst.

The calcined catalyst, No. 410G–9337, analyzed 0.6 weight percent platinum, 0.67 weight percent chloride, 0.004 weight percent iron and 4.08 weight percent volatile matter (ignited at 1000° C.).

Catalyst 410G–9337 was contacted under accelerated test conditions with about 38 Research Method Octane (neat) Mid-Continent straight run naphtha typically of 246 to 359° F. ASTM distillation boiling point range and analyzing:

| | Percent |
|---|---|
| Paraffins | 46.7 |
| Olefins | 1 |
| Naphthenes | 44.8 |
| Aromatics | 8.3 |

Two reforming runs of 48 hours each using this feed stock were conducted at 940° F., 200 p. s. i. g., and 5 moles of gas recycle per mole of hydrocarbon feed. The recycle gas consisted principally of hydrogen with a minor amount of methane being present. The naphtha feed was charged to the reaction vessel at a space velocity of 15 WHSV. In one aging run, the initial Research Method Octane (neat) was 89.7 while in another aging run the initial Research Method Octane (neat) was 89.8.

As shown, an acidic promoter such as the fluoride ion can be incorporated in the catalyst although this is believed undesirable if the catalyst is to be regenerated. The other members of the platinum family can be utilized in preparation of catalyst in analogous fashion to Examples I and II, but although the resulting catalysts have properties of interest for specific reactions, they do not appear to be as good as platinum for reforming use. The platinum metal advantageously is incorporated in the hydrate precursor base but can be incorporated in the dried or calcined base.

Except for the X-ray diffraction data, unless otherwise indicated when specifying percentages of components of the catalyst composition and of the alumina hydrate it is referred to weight per cent on an ignited basis. Also, surface area as mentioned above is calculated on an ignited weight basis.

It is claimed:

1. A process for the preparation of an alumina hydrate composition of alumina trihydrate which comprises mixing an aqueous solution of a salt of aluminum with aqueous ammonium hydroxide while controlling the relative amounts of said salt of aluminum and said ammonium hydroxide to effect a pH of the mixed solution from 7 to about 9.5 during precipitation of substantially the entire alumina hydrate and while controlling the temperature from about 70° to about 160° F., separating precipitated alumina hydrate from the resulting solution, washing the alumina hydrate with water to remove contaminating water-soluble ions while maintaining a pH of at least about 7 and converting the washed hydrate composition to an alumina hydrate containing about 65 to about 95% of alumina trihydrate.

2. The process of claim 1 in which the mixed solution has a substantially constant ammonium salt concentration during precipitation of the alumina hydrate.

3. The process of claim 1 in which the aluminum salt is aluminum chloride.

4. In the production of an alumina base-platinum metal catalyst by formation of an alumina hydrogel, converting the hydrogel to a hydrate composition predominating in alumina trihydrate, incorporating a platinum metal in the hydrate composition in finely distributed form, drying and calcining the resulting catalyst, a process for preparation of the alumina hydrate composition which comprises mixing an aqueous solution of a salt of aluminum with aqueous ammonium hydroxide while controlling the relative amounts of said salt of aluminum and said ammonium hydroxide to effect a pH of the mixed solution from 7 to about 9.5 during precipitation of substantially the entire alumina hydrate and while controlling the temperature from about 70° to about 160° F., separating precipitated alumina hydrate from the resulting solution, washing the alumina hydrate with water to remove contaminating water-soluble ions while maintaining a pH of at least about 7, and converting the washed hydrate composition to a mixture containing from about 65 to about 95 percent alumina trihydrate phase.

5. The process of claim 4 in which the mixed solution has a substantially constant ammonium salt concentration during precipitation of the alumina hydrate.

6. The process of claim 4 in which the aluminum salt is aluminum chloride.

References Cited in the file of this patent

UNITED STATES PATENTS

| | | |
|---|---|---|
| 1,929,942 | Barclay | Oct. 10, 1933 |
| 2,137,638 | Sondern et al. | Nov. 22, 1938 |
| 2,590,833 | Bechtold | Apr. 1, 1952 |
| 2,595,056 | Connolly | Apr. 29, 1952 |
| 2,602,772 | Haensel | July 8, 1952 |
| 2,623,860 | Haensel | Dec. 30, 1952 |